Figure 1:
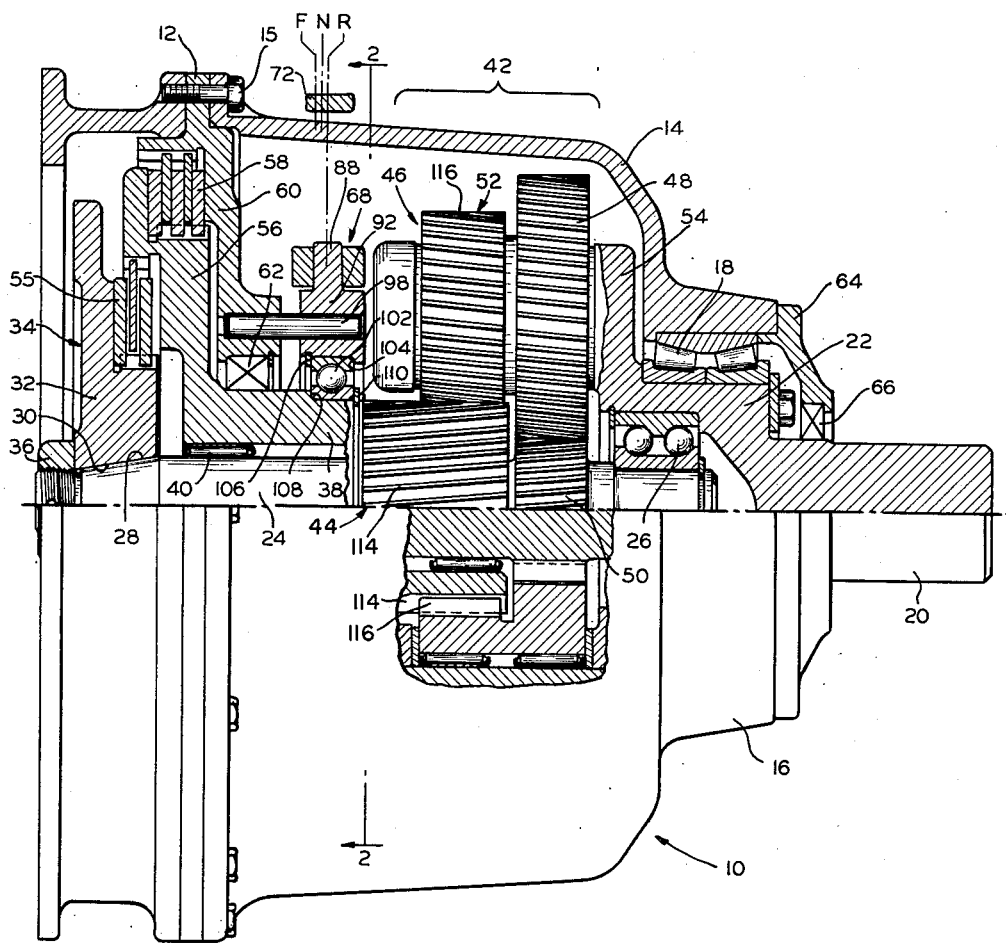

INVENTOR.
BARRY L. FROST

Nov. 21, 1961 B. L. FROST 3,009,370
REVERSING MECHANISM
Filed Aug. 23, 1960 2 Sheets-Sheet 2
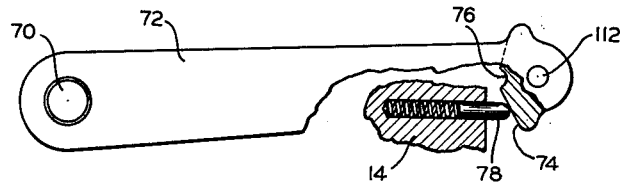
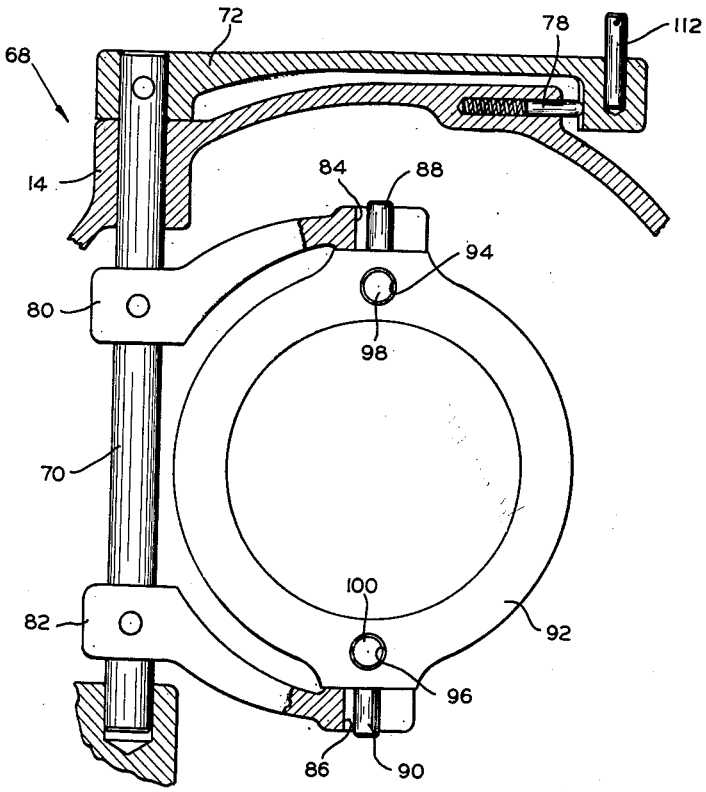
INVENTOR.
BARRY L. FROST
BY
*Kenneth C. Witt*
ATTORNEY 3,009,370
REVERSING MECHANISM
Barry L. Frost, Jackson, Mich., assignor to Clark Equipment Company, a corporation of Michigan
Filed Aug. 23, 1960, Ser. No. 51,373
5 Claims. (Cl. 74—784)

This invention relates to reversing gear mechanisms, and more specifically to such mechanisms which employ planetary gear trains.

My device not only utilizes the compactness of a planetary gear set but also saves space by eliminating the need for an additional mechanism to hold the forward clutch or reverse brake in engagement, by utilizing the axial thrust of helical gears in the planetary gear set.

A principal object of my invention is to provide a dependable and compact reversing mechanism.

Another object of my invention is to provide a reversing mechanism in which the friction engaging devices are held in engagement by the axial thrust of the associated helical gears.

In a preferred form of my invention I utilize a pair of coxial left-hand helical sun gears with the inner sun gear being utilized as the input element of the planetary gear set, a plurality of stepped right-hand helical planet pinions rotatably mounted upon a planet carrier utilized as the output element, a disc brake, and a disc clutch. Each planet pinion has a large diameter portion which meshes with the inner sun gear and a small diameter portion which meshes with the outer sun gear.

The outer sun gear is slidable axially from a neutral position either fore or aft which causes engagement of the forward clutch or reverse brake respectively. The forward clutch connects the outer and inner sun gears together so that they rotate as a unit locking up the planetary gear set, thus causing the planet carrier to rotate in the same direction and at the same speed as both sun gears, while the reverse brake causes the outer sun gear to be held so the planet carrier rotates in the opposite direction to the inner sun gear.

In either forward or reverse drive, the axial thrust between the outer sun gear and the small diameter portion of the planet pinions holds the respective clutch or brake in engagement.

The above and other objects, advantages and features of my invention will be more fully understood by one skilled in the art from the following detailed description when taken in conjunction with the drawing in which:

FIGURE 1 is a side elevational view, in section above the center line except for the gears; and partially in section belt the center line, illustrating my invention engaged for reverse drive, FIGURE 2 is a fragmentary sectional view along line 2—2 in FIG. 1 showing the shift mechanism, and FIGURE 3 is a top view showing to better advantage the detent means forming a part of the shifting mechanism.

Referring to the drawing, the numeral 10 denotes a housing comprising an end plate 12 and a casing 14 which are connected together by any suitable means such as machine screws 15. The casing 14 has a hub portion 16 extending axially outwardly from it in which a double roller bearing 18 is mounted for journaling output shaft 20 in the casing 14.

The output shaft 20 has a quill portion 22 within which the input shaft 24 is partially telescoped and journaled by a ball bearing 26. The input shaft 24 has a tapered portion 28 which cooperates with the tapered portion 30 of the hub 32 of the flange 34 to fixedly mount the flange 34 on the input shaft 24. The flange 34 is held in place by any suitable means, such as a castellated nut 36. Concentric with the input shaft 24 is an axially slidable sleeve 38 which is rotatably mounted on shaft 24 by means of roller or needle bearings 40.

The planetary gear set 42 has an outer helical sun gear 44 formed upon the sleeve 38 which meshes with a plurality of step type helical planet pinions indicated generally at 46. The pinions 46 include a relatively large diameter portion 48 meshing with an inner helical sun gear 50 and a small diameter portion 52 meshing with the outer sun gear 44. The gear portions 48 and 52 of the pinion 46 are axially offset one from the other and the pinions 46 are rotatably supported upon a planet carrier 54 which is integral with the quill portion 22 of output shaft 20.

A multiple-disc type friction clutch 55 of conventional construction is positioned between the flange 34 and a stepped radially outwardly extending flange portion 56 of sleeve 38. This clutch 55 causes the outer sun gear 44 and the inner sun gear 50 to rotate as a unit when it is engaged.

A multiple-disc type friction brake 58 of conventional construction is positioned between the stepped portion 56 on sleeve 38 and a stepped portion 60 of end plate 12. This brake 58 causes the outer sun gear 44 to be held when it is engaged.

The stepped portion 60 in combination with an annular seal 62 keeps the lubricant for the planetary set 42 separated from the disc clutch 54 and brake 58. A seal holder 64 is attached to the hub portion 16 of the casing by any suitable means and carries an annular seal 66.

A shifting mechanism 68 actuates the sleeve 38 to either the left or right of its neutral position, as seen in FIG. 1. The shifting mechanism 68 comprises a vertical shifting shaft 70 which is rotatably mounted in the casing 14 and extends through the casing 14 at the top where a shifting lever 72 is fixedly attached to it. The shifting lever 72 extends at right angles from the shifting shaft 70 and has at its opposite end a downwardly extending projection having an inwardly facing arcuate portion 74 interrupted by a downwardly extending groove 76. A spring loaded detent 78 positioned in the casing 14 cooperates with the arcuate portion 74 and the groove 76 to either hold the shifting mechanism in its neutral position or urge it into its forward or reverse position. Fixedly mounted on the shifting shaft 70 are a pair of shifting fork arms 80 and 82. These arms 80 and 82 have a pair of slots 84 and 86, respectively, which receive pins 88 and 90 of a bearing carrier 92. The bearing carrier 92 has a pair of guide holes 94 and 96 which slidably receive a corresponding pair of guide pins 98 and 100 which are fixedly mounted in a stepped portion 60 of the end plate 12 in parallel axially extending relationship. The bearing carrier 92 carries a ball bearing 102 which is positioned between the bearing carrier 92 and the sleeve 38. The bearing 102 is held by the bearing carrier 92 between a shoulder 104 and a snap ring 106. The bearing 102 is also fixedly attached to the sleeve 38 between a shoulder 108 and a snap ring 110. The shifting mechanism 68 is actuated by any suitable means, such as a control rod, not shown, suitably attached to a pin 112 mounted on the shifting lever 72.

I shall now describe the operation of my invention. Assume that the input shaft 24 is turning in a clockwise direction when viewed from the left in FIG. 1 and further assume that the shift fork 68 is moved to the right from its neutral position. Movement of the shift fork 68 to the right will cause sleeve 38 to move to the right also and thereby cause initial engagement of the disc brake 58. Initial engagement of disc brake 58 causes the sleeve 38 to be locked to the end plate 12 thus holding the outer sun gear 44. This causes the planetary pinions 46 and planet carrier 54 to revolve around the outer sun gear 44 in a counterclockwise direction, thus giving reverse drive from the output shaft 20.

During reverse drive, the sun gear 44 acts as a reaction member and has a force applied to it by the small diameter portion 52 of the planet pinions 46. This force has an axial component which urges the sun gear 44 to the right due to the left-hand helical teeth 114 of the sun gear and the right-hand helical teeth 116 of the small diameter portion 52 of the pinions 46. This axial force tends to keep the disc brake 58 engaged after initial engagement and increases proportionately with the input force.

Assuming now that the shift fork 68 is actuated to the left from its neutral position, the sleeve 38 is thereby moved to the left thus initially engaging the disc clutch 55. Engagement of the disc clutch 55 locks the sleeve 38 to the flange 34 so that the outer sun gear 44 and the inner sun gear 50 rotate together. This locks up the planetary set 42 so that the output shaft 20 rotates with the input shaft 24 thereby giving forward drive.

During forward drive, the sun gear 44 acts as a driving member and applies a force to the small diameter portion 52 of the pinions 46. This force has an axial component due to the left-hand helical teeth 114 of the sun gear 44 and the right-hand helical teeth 116 of the small diameter portion 52 of the pinions 46. This axial component has an opposite reaction force which urges the sun gear 44 to the left thereby tending to keep the disc clutch 55 engaged after initial engagement and increases proportionately with the input force.

During either reverse or forward drive, the sleeve 38 cannot be shifted until the input force is relieved.

While I have described one preferred form of my invention, I do not intend to be so limited, since many modifications may be made, and it is therefore contemplated by the appended claims to cover any such modifications as fall within the true spirit and scope of the invention.

I claim:

1. A reversing mechanism comprising an input shaft, a rotatable axially slidable sleeve mounted coaxially of said input shaft, an output shaft, a planetary gear set comprising a planet carrier operatively connected to said output shaft, an outer sun gear operatively connected to said sleeves, an inner sun gear operatively connected to said input shaft, said inner sun gear being positioned in axial spaced apart relationship with said outer sun gear, and at least one stepped planet pinion rotatably mounted on said planet carrier, said pinion having a small diameter portion meshing with the said outer sun gear and a large diameter portion meshing with said inner sun gear, clutch means for connecting said sleeve to said input shaft for locking up said planetary gear set to provide direct drive between said input shaft and said output shaft, brake means for holding said outer sun gear to provide reverse drive between said input shaft and said output shaft, selective means for actuating said clutch and brake means, and means for holding said clutch and brake means in their respective actuated positions comprising helical teeth on said outer sun gear.

2. A reversing mechanism comprising an input shaft, a rotatable axially slidable sleeve mounted concentrically of said input shaft, an output shaft, a planet carrier operatively connected to said output shaft, a planetary gear set comprising an outer sun gear operatively connected to said sleeve, an inner sun gear operatively connected to said input shaft, said inner sun gear being positioned in coaxial spaced apart relationship with said outer sun gear and a plurality of stepped planet pinions rotatably mounted on said planet carrier, said pinions having a small diameter portion meshing with said outer sun gear and a large diameter portion meshing with said inner sun gear, a multiple disc type friction clutch for connecting said sleeve to said input shaft for locking up said planetary gear set to provide direct drive between said input shaft and said output shaft, a multiple disc type friction brake for holding said outer sun gear to provide reverse drive between said input shaft and said output shaft, means for engaging alternatively said clutch and brake, and means for holding said clutch and brake in their engaged position comprising helical teeth on said outer sun gear.

3. A reversing mechanism comprising a housing, an input shaft, a rotatable axially slidable sleeve having a stepped outwardly extending flange portion and mounted coaxially of said input shaft, an output shaft, a planet carrier integral with said output shaft, a planetary gear set comprising an outer sun gear integral with said sleeve, an inner sun gear integral with said input shaft, said inner sun gear being positioned in coaxial spaced apart relationship with said outer sun gear and a plurality of stepped planet pinions equidistantly spaced and rotatably supported upon said planet carrier, said pinions having a small diameter portion meshing with said outer sun gear and a large diameter portion meshing with said inner sun gear, a multiple disc type friction clutch positioned between said input shaft and said flange for connecting said input shaft with said sleeve for rotation together thus locking up said planetary gear set to provide direct drive between said input shaft and said output shaft, a multiple disc type friction brake positioned between said housing and said flange for connecting said sleeve to said housing thus holding said outer sun gear to provide reverse drive between said input shaft and said output shaft, a shifting mechanism for actuating said sleeve to engage either said clutch or said brake, and means for holding either said clutch or said brake in its engaged position comprising left-hand helical teeth on said outer sun gear.

4. A reversing mechanism as claimed in claim 3 having detent means for initially holding said clutch and brake in engagement.

5. A reversing mechanism comprising a housing having a casing and end plate, an input shaft, a rotatable axially slidable sleeve having a stepped outwardly extending flange portion and mounted concentrically of said input shaft, an output shaft journaled in said housing, said output shaft having a quill portion in which said input shaft is partially telescoped and journaled, a planet carrier integral with said output shaft, a planetary gear set comprising an outer sun gear integral with said sleeve, an inner sun gear integral with said input shaft, said inner sun gear positioned in coaxial spaced apart relationship with said outer sun gear and three equidistantly spaced stepped planet pinions rotatably mounted on said planet carrier, said pinions having right-hand helical teeth, a small diameter portion meshing with said outer sun gear and a large diameter portion meshing with said inner sun gear, a multiple disc type friction positioned between said input shaft and said flange for connecting said sleeve with said input shaft thus locking up said planetary gear set to provide direct drive between said input shaft and said output shaft, a multiple disc type friction brake positioned between said flange and said end plate for connecting said sleeve with said end plate thus holding said outer sun gear and providing reverse drive between said input shaft and said output shaft, a shifting mechanism for slidably actuating said sleeve in order to engage either said clutch or said brake, selective means for initially engaging said clutch or brake and means for holding either said clutch or brake in its actuated position comprising left-hand helical teeth on said outer sun gear.

References Cited in the file of this patent

UNITED STATES PATENTS 1,880,554    Wattleworth _____ Oct. 4, 1932